(12) United States Patent
Chin et al.

(10) Patent No.: US 8,775,744 B2
(45) Date of Patent: Jul. 8, 2014

(54) SIMULTANEOUS SWITCHING OF MULTIPLE TIME SLOTS IN AN OPTICAL NETWORK NODE

(76) Inventors: Chung Kuang Chin, Saratoga, CA (US); Shankar Venkataraman, Sunnyvale, CA (US); Swaroop Raghunatha, Milpitas, CA (US)

(*) Notice: Subject to any disclaimer, the term of this patent is extended or adjusted under 35 U.S.C. 154(b) by 1235 days.

(21) Appl. No.: 12/550,497

(22) Filed: Aug. 31, 2009

(65) Prior Publication Data

US 2011/0055491 A1 Mar. 3, 2011

(51) Int. Cl.
*G06F 12/00* (2006.01)
*G06F 3/00* (2006.01)

(52) U.S. Cl.
USPC ............................ 711/149; 710/20; 710/21

(58) Field of Classification Search
USPC ................................ 710/20, 21; 711/149
See application file for complete search history.

(56) References Cited

U.S. PATENT DOCUMENTS

| | | | | |
|---|---|---|---|---|
| 5,774,698 A * | 6/1998 | Olnowich | | 712/1 |
| 6,480,942 B1 * | 11/2002 | Hirairi | | 711/156 |
| 7,009,964 B2 * | 3/2006 | Fisher et al. | | 370/363 |
| 2003/0084246 A1 * | 5/2003 | Tran et al. | | 711/122 |
| 2004/0165584 A1 * | 8/2004 | Libeskind | | 370/388 |

* cited by examiner

*Primary Examiner* — Farley Abad
(74) *Attorney, Agent, or Firm* — David L. Soltz; Harrity & Harrity LLP

(57) ABSTRACT

A switching frame buffer is described in which data units within a sequence of time slots, of a frame, may be simultaneously input and output at ports of the switching frame buffer. In one implementation, a write port may receive data units within a single cycle of the switch. A number of memories may be provided, where first selected ones of the memories constitute memory groups and second selected ones of the memories constitute a memory subsets, each of the memory groups including a corresponding one of the memory subsets. The write port may supply each of a number of copies of the data units to a corresponding one of the memory subsets. Multiplexers may be associated with the groups of the memories and a read port may receive one of the copies of a number of the data units from different ones of the multiplexers.

15 Claims, 17 Drawing Sheets

US 8,775,744 B2

SIMULTANEOUS SWITCHING OF MULTIPLE TIME SLOTS IN AN OPTICAL NETWORK NODE

BACKGROUND

Optical networks transmit data over optical fiber. In an optical network, multiplexing protocols such as synchronous optical networking (SONET) and synchronous digital hierarchy (SDH) may be used to transfer multiple digital bit streams over the same optical fiber. Lasers or light emitting diodes (LEDs) may be used to generate optical signals that carry the digital bit streams.

Bit streams traversing an optical network may pass through transponder switches. Such a switch may, for example, connect to multiple different fiber ports. Bit streams may be received at the switch, converted to an electrical signal, switched to the appropriate output port based on the electrical signal, converted back to an optical signal, and output as an optical signal on the determined output port.

The switching of an optical signal between ports in the transponder switch may involve the conversion of a serial bit stream into chunks of data that are written to a memory. The data for the bit stream may subsequently be read out of the memory on a path corresponding to the determined output port and converted back to a serial stream. As the bandwidth of the transponder switch increases, the design and layout complexity of the switching circuitry may increase.

SUMMARY

In one implementation, a switch may include a write port configured to receive data units within a single switching cycle of the switch. The switch may further include a number of memories, first selected ones of the memories constituting memory groups and second selected ones of the memories constituting memory subsets, each of the memory groups including a corresponding one of the memory subsets, where the write port supplies each of the copies of the data units to a corresponding one of the memory subsets. The switch may further include a number of multiplexers, each of the multiplexers being associated with a corresponding one of the memory groups, each of the multiplexers being configured to selectively supply one of the copies of the data units from one of the groups of memories; and a read port associated with a subset of the multiplexers, the read port configured to receive, within a single switching cycle of the switch, one of the copies of the data units from different ones of the multiplexers.

In an other implementation, a device may include a write port configured to receive first and second data units from a sequence; and memories provided in groups, such that the write port may supply each of a number of copies of the first and second data units to first and second subsets of the memories, each of the subsets of the memories may be provided in the groups, a number of the copies of the first and second data units being greater than two. The device may further include multiplexers, each of which may be associated with a corresponding one of the groups of the memories, one of the multiplexers may be configured to selectively supply one of the copies of the data unit from one of the memories; and a read port configured to receive the first and second data units from the first and second ones of the multiplexers and output said first and second data units.

In another implementation, a device may include a multi-port memory switch and a cross-connect switch. The multi-port memory switch may include a number of write ports each configured to receive data units; a number of memories, first selected ones of the memories constituting memory groups and second selected ones of the memories constituting memory subsets, each of the memory groups including a corresponding one of the memory subsets, where the write port supplies each of a number of copies of the data units to a corresponding one of the memory subsets; and a number of read ports, each configured to output at least one of the copies of each received data unit, where a sequence of data units received at one of the write ports may be transposed and output at different ones of the plurality of read ports. The cross-connect switch may include a number of input ports configured to receive sequences of data units output from the read ports of the multi-port memory switch and output ports configured to output the received sequences of data units after a switching between ones of the input ports to corresponding others of the output ports.

In yet another implementation, a memory may include a number of write ports each including a first set of input data lines and a second set of input data lines; read ports each including a first set of output data lines and a second set of output data lines; and groups of memories, where the first set of input data lines, for each of the write ports, may be connected to one memory in each of the groups of memories, and the second set of input data lines, for each of the write ports, may be connected to another memory in each of the groups of memories, and where the first set of output data lines may be connected to all of the memories in one of the groups of memories and the second set of output data lines may be connected to all of the memories in a second one of the groups of memories, where the first one of the groups of memories is different from the second one of the groups of memories.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Implementations, described herein, may provide a switching frame buffer that includes input ports and output ports. A data unit received at any of the input ports may be output at any of the output ports. Multiple portions of the data unit, such as data of multiple time slots within a frame, may be simultaneously input and output to the switching frame buffer. By simultaneously switching data of multiple time slots, the bandwidth of the switching frame buffer memory may be increased.

Exemplary Network

Figure 1:
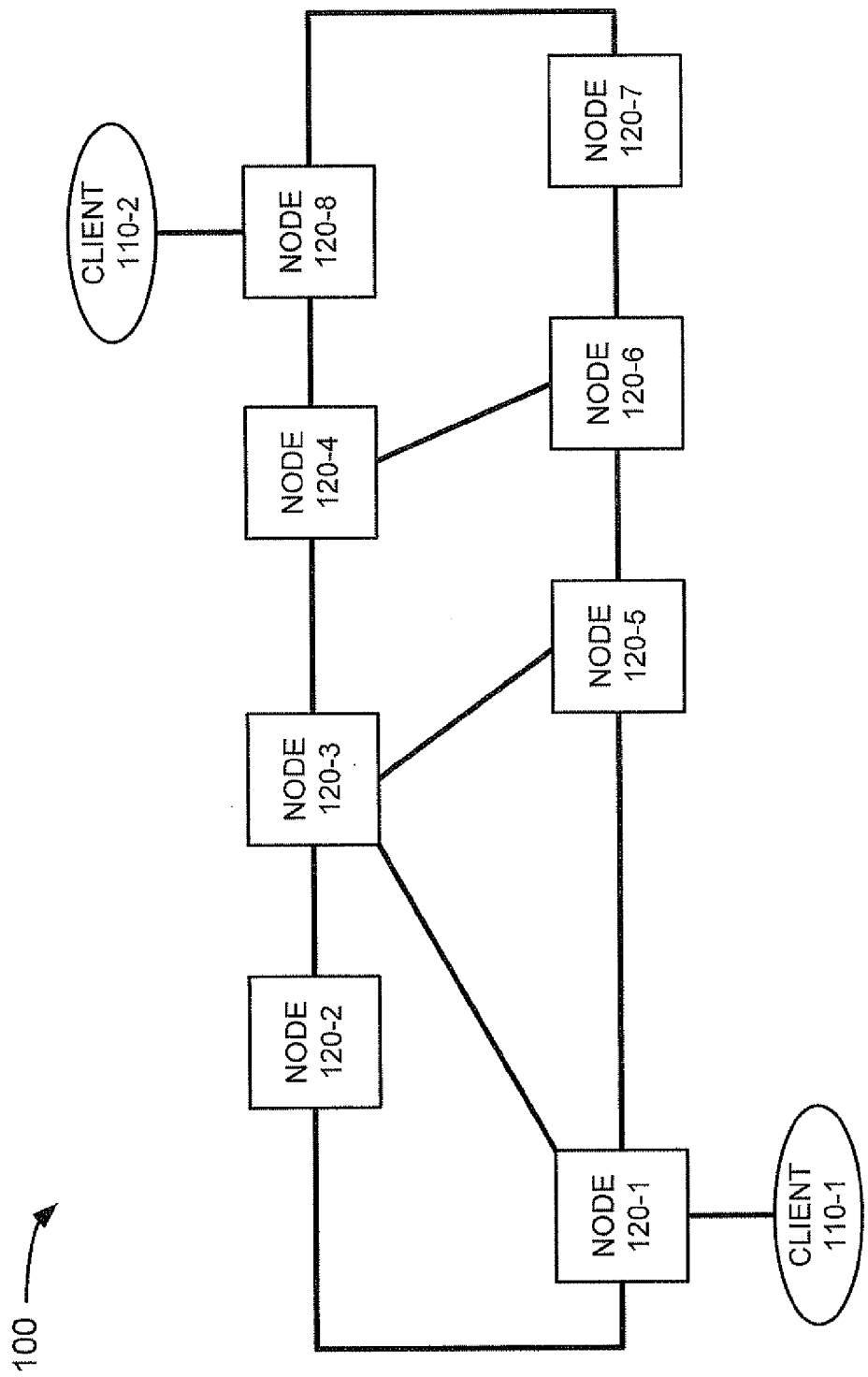
FIG. 1 is a diagram of an exemplary network in which systems and/or methods described herein may be implemented.

FIG. 1 is a diagram of an exemplary network 100 in which systems and/or methods described herein may be implemented. Network 100 may include clients 110-1 and 110-2 (referred to collectively as "clients 110," and generally as "client 110") and nodes 120-1, . . . , 120-8 (referred to collectively as "nodes 120," and generally as "node 120"). While FIG. 1 shows a particular number and arrangement of devices, network 100 may include additional, fewer, different, or differently arranged devices than those illustrated in FIG. 1. Also, the connections between devices may include direct or indirect connections.

Client 110 may include any type of network device, such as a router, a switch, or a central office, that may transmit data traffic. In one implementation, client 110 may transmit a client signal (e.g., a synchronous optical network (SONET) signal, a synchronous digital hierarchy (SDH) signal, an Ethernet signal, or another type of signal) to node 120. The client signal may conform to any payload type, such as Gigabit Ethernet (GbE), 2xGbE, Fibre Channel (FC), 1 GFC, 10 GbE local area network (LAN) physical layer (Phy), 10 GbE wide area network (WAN) Phy, Synchronous Transport Mode 16 (STM-16), STM-64, Optical Carrier level 48 (OC-48), or OC-192.

Nodes 120 may be nodes in an optical network, or an optical portion of a network. Nodes 120 may be connected via optical links. Data traffic may flow from node-to-node over a series of channels/sub-channels forming a path. Any two nodes 120 may connect via multiple optical links. For bidirectional communication, for example, a first optical link may be used for data traffic transmitted in one direction, a second optical link may be used for data traffic transmitted in the opposite direction, and a third optical link may be used in case of a failure on the first link or the second link.

Each node 120 may act as, among other things, an optical switching device in which data is received over an optical link, converted to electrical signals, switched based on the electrical signals, and then output, as an optical signal, to an optical link determined by the switching.

Exemplary Node Components

Figure 2:
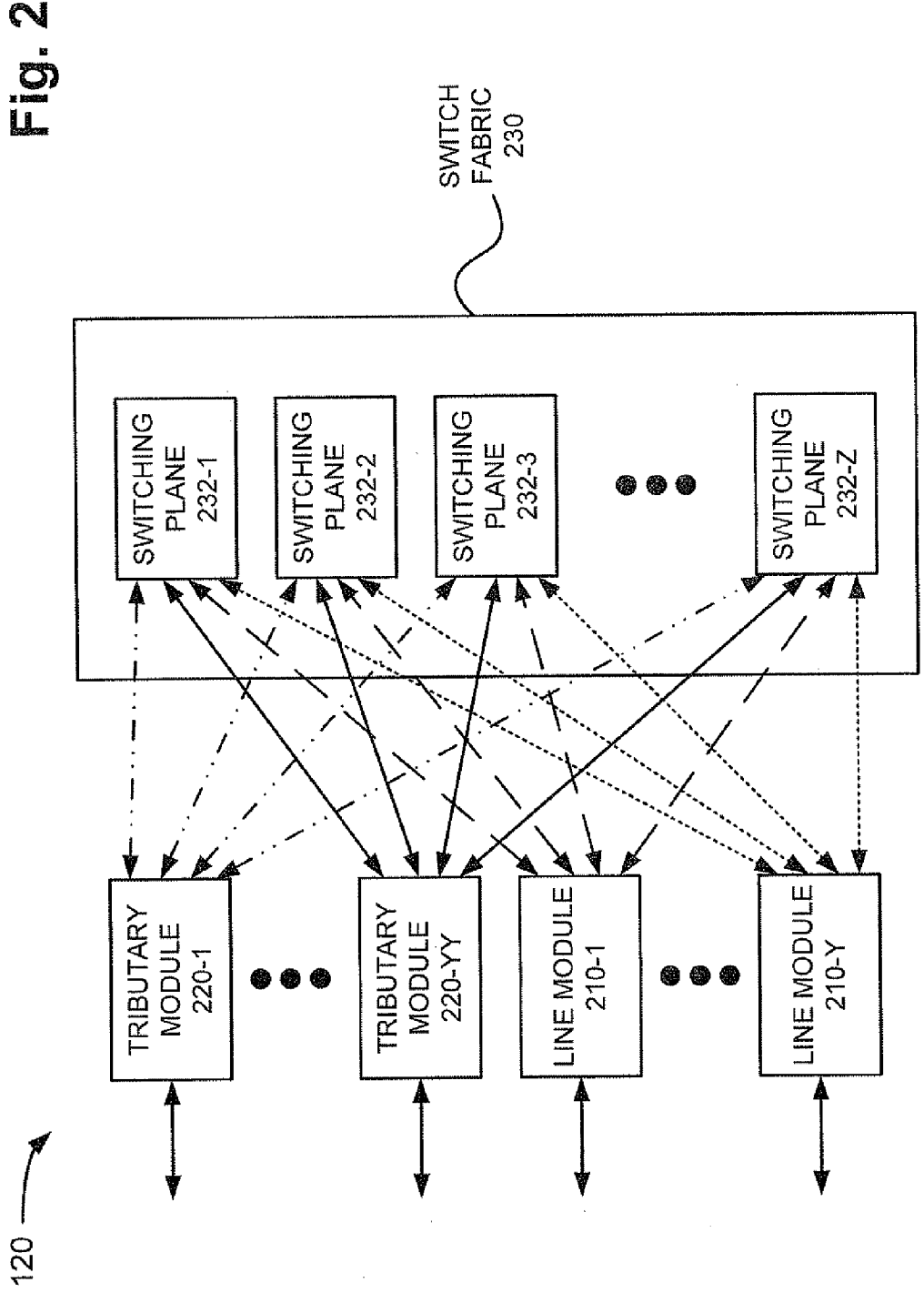
FIG. 2 is a diagram of exemplary components of the nodes shown in FIG. 1.

FIG. 2 is a diagram of exemplary components of node 120. As shown in FIG. 2, node 120 may include line modules 210-1, . . . , 210-Y (referred to collectively as "line modules 210," and generally as "line module 210") (where Y≥1) and tributary modules 220-1, . . . , 220-YY (referred to collectively as "tributary modules 220," and generally as "tributary module 220") (where YY≥1) connected to a switch fabric 230. As shown in FIG. 2, switch fabric 230 may include switching planes 232-1, 232-2, . . . 232-Z (referred to collectively as "switching planes 232," and generally as "switching plane 232") (where Z≥1). While FIG. 2 shows a particular number and arrangement of components, node 120 may include additional, fewer, different, or differently arranged components than those illustrated in FIG. 2. Also, it may be possible for one of the components of node 120 to perform a function that is described as being performed by another one of the components.

Line module 210 may include hardware components, or a combination of hardware and software components, that may provide network interface operations. Line module 210 may receive a multi-wavelength optical signal and/or transmit a multi-wavelength optical signal. A multi-wavelength optical signal may include a number of optical signals of different optical wavelengths. In one implementation, line module 210 may perform retiming, reshaping, regeneration, time division multiplexing, and/or recoding services for each optical wavelength. Line module 210 may also convert input optical signals into signals represented as electrical signals.

Tributary module 220 may include hardware components, or a combination of hardware and software components, that may support flexible adding-dropping of multiple services, such as SONET/SDH services, GbE services, optical transport network (OTN) services, and FC services. Tributary module 220 may be particularly used to connect nodes 120 to clients 110. Tributary module 220 may also convert input optical signals into signals represented as electrical signals.

Switch fabric 230 may include hardware components, or a combination of hardware and software components, that may provide switching functions to transfer data between line modules 210 and/or tributary modules 220. In one implementation, switch fabric 230 may provide fully non-blocking transfer of data. Each switching plane 232 may be programmed to transfer data from a particular input to a particular output. Switching planes 232 may generally operate by storing data into multi-port digital memories, where data may be read into the digital memories at one port and read out at another port.

As shown in FIG. 2, each of line modules 210 and tributary modules 220 may connect to each of switching planes 232. The connections between line modules 210/tributary modules 220 and switching planes 232 may be bidirectional. While a single connection is shown between a particular line module 210/tributary module 220 and a particular switching plane 232, the connection may include a pair of unidirectional connections (i.e., one in each direction).

Switching Operation of Nodes 120

Figure 3:
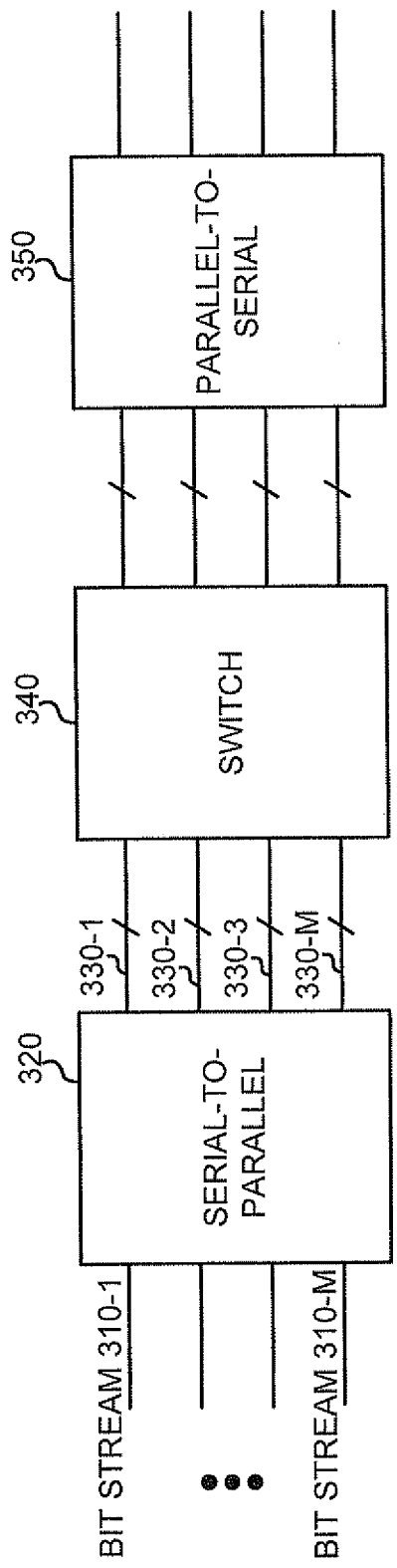
FIG. 3 is a diagram conceptually illustrating switching of data.

FIG. 3 is a diagram conceptually illustrating switching of data, as performed by line modules 210, tributary modules 220, and/or switching fabric 230. As shown, input data may be received as multiple independent bit streams 310-1 through 310-M (collectively, streams 310). Each bit stream may correspond to a stream received over an optical link. Each stream 310 may be converted to a parallel block of data (e.g., a block 20 bits wide) by serial-to-parallel component 320 to produce M output parallel streams 330-1 through 330-M (collectively, streams 310). Each block of data in parallel streams 330 may be written to switch 340. Subsequently, each data unit may be read from switch 340 and converted back to its original serial stream by parallel-to-serial component 350. Data may be read at output ports of switch 340 that correspond to the egress path of the stream through node 120. In this manner, input streams may be switched to a desired output path.

In one implementation, switch 340 may be implemented as, for example, a multi-port dynamic or static random access memory. Switch 340 may be designed to be able to simultaneously write input data at write ports and read output data from read ports. In particular, data units may be written to switch 340 through one write port of the multi-port memory and read out from any of the read ports of the multi-port memory.

In some implementations, switch 340 may also act as a frame buffer, in which switch 340 may store data units for a complete frame before the frame is read out of switch 340. In other implementations, switch 340 may include a multi-port memory used in the context of other applications.

Switch 340

Figure 4:
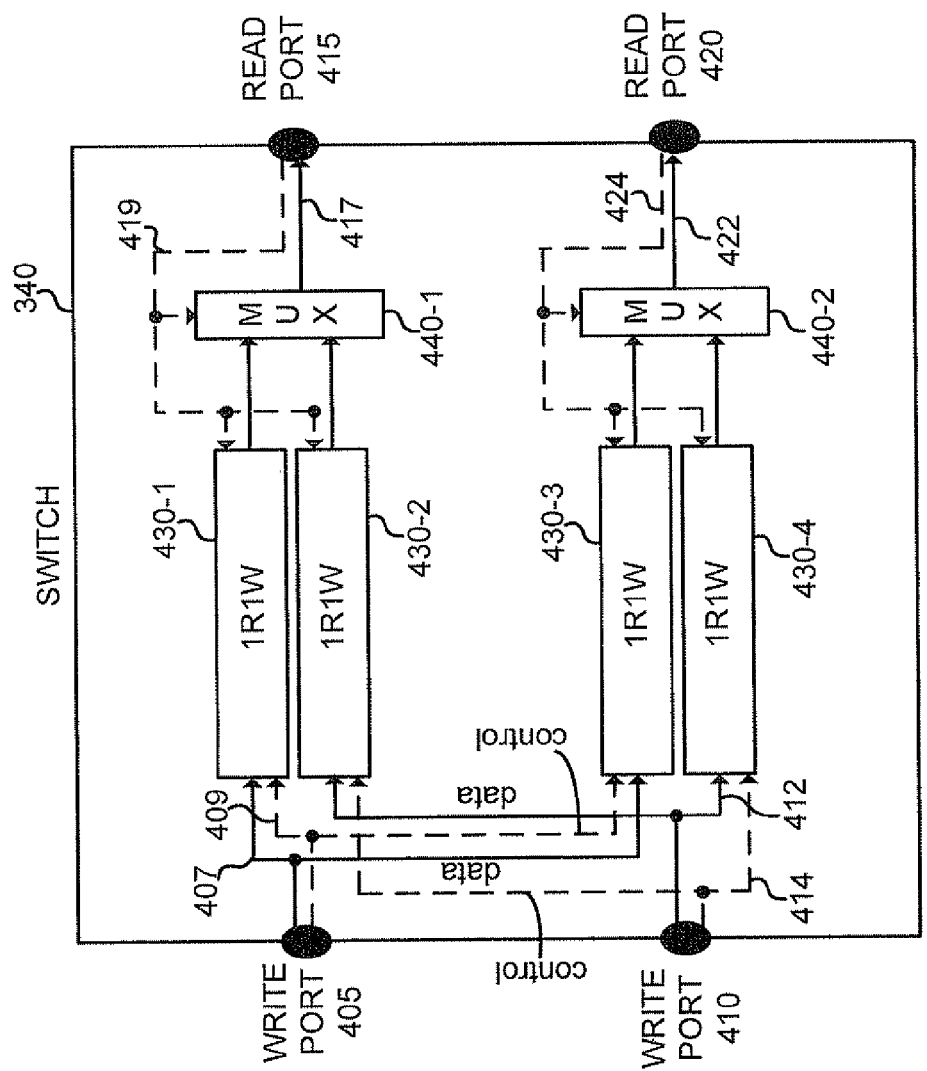
FIG. 4 is a diagram illustrating an exemplary implementation of the switch shown in FIG. 3.

FIG. 4 is a diagram illustrating an exemplary implementation of switch 340. Switch 340 may include two write ports 405 and 410, and two read ports 415 and 420. Each of write ports 405 and 410 may act as an independent port through which data units can be written to switch 340. During a write cycle, both ports 405 and 410 (or one of ports 405 or 410) can be used to independently write data units to switch 340. That is, a first data unit may be written to switch 340 through port 405 and a second data unit may be written to switch 340 through port 410.

Data lines and control lines may be associated with each port of switch 340. Data lines are shown in FIG. 4 as solid lines and control lines are shown as dashed lines. Write port 405, for instance, is associated with data lines 407 and control lines 409. Data lines 407 may include a number of lines equal to the width of the memory port. Each data line 407 may be, for example, 8 bits wide. Control lines 409 may include address lines used to receive the address at which the data is written and a write enable line used to control when writing is enabled. Write port 410 may include a similar set of data lines 412 and control lines 414.

Read ports 415 and 420 may also be associated with data and control lines. For read port 415, the output data units may be transmitted over data lines 417. Input control lines 419 may be used to provide a read address and a read enable signal. Similarly, for read port 420, the output data units may be transmitted over data lines 422. Input control lines 424 may be used to provide the read address and a read enable signal.

Switch 340 may include a number of one-read-one-write (1R1W) memories 430-1 through 430-4. Memories 430 may be thought of as being logically grouped (groups 430-1, 430-2; and 430-3, 430-4) into a number of groups equal to the number of write ports or read ports. For the memories within a group, each write port may write to one memory in the group, and a single read port may read from all of the memories in a group. With this construction, any read port may read the data written at any of the write ports. This may be a particularly useful feature for a non-blocking switch, in which data units may be written at any write port and read out at any read port.

One-read-one-write memories are generally known in the art and may be typically available in standard circuit design libraries. In a 1R1W memory, a data unit may be written to the memory at one address while another data unit may be simultaneously read from the memory at another address.

Switch 430 may also include multiplexers 440-1 and 440-2. Multiplexer 440-1 may receive a data unit output from 1R1W 430-1 and a data unit output from 1R1W 430-2. Multiplexer 440-1 may select one of the data units, based on a signal from control line 419, to output at read port 415. Multiplexer 440-2 may receive a data unit output from 1R1W 430-3 and a data unit output from 1R1W 430-4. Multiplexer 440-2 may select one of the data units, based on a signal from control line 424, to output at read port 420.

In the operation of switch 340, data units may be received at write ports 405 and 410. Each data unit received at write port 405 may be written to the same address in two 1R1W memories: 1R1W 430-1 and 1R1W 430-3. Similarly, each data unit received at write port 415 may be written to the same address in two 1R1W memories: 1R1W 430-2 and 1R1W 430-4.

Concurrently with the writing of data units to memory 430, data units may be read at read ports 415 and 420. An address received at read port 415 may be applied to both of memories 430-1 and 430-2. The address may be further used to control multiplexer 440-1 to select one of the data units. Similarly, an address received at read port 420 may be applied to both of memories 430-3 and 430-4. The address may be further used to control multiplexer 440-2 to select one of the data units.

With switch 340, multiple 1R1W memories can be used to construct a multi-port memory. In the example of FIG. 4, a two-read-two-write (2R2W) memory is implemented using four 1R1W memories.

Although switch 340 is shown in FIG. 4 as a 2R2W memory, in alternative implementations, a memory with additional ports may be constructed. In general, for switch 340, the number of 1R1W memory groups and the number of 1R1W memories in each group may be equal to the number of write or read ports. Additionally, one multiplexer may be used for each group to connect one of the 1R1W memories in a group to the output port.

Figure 5:
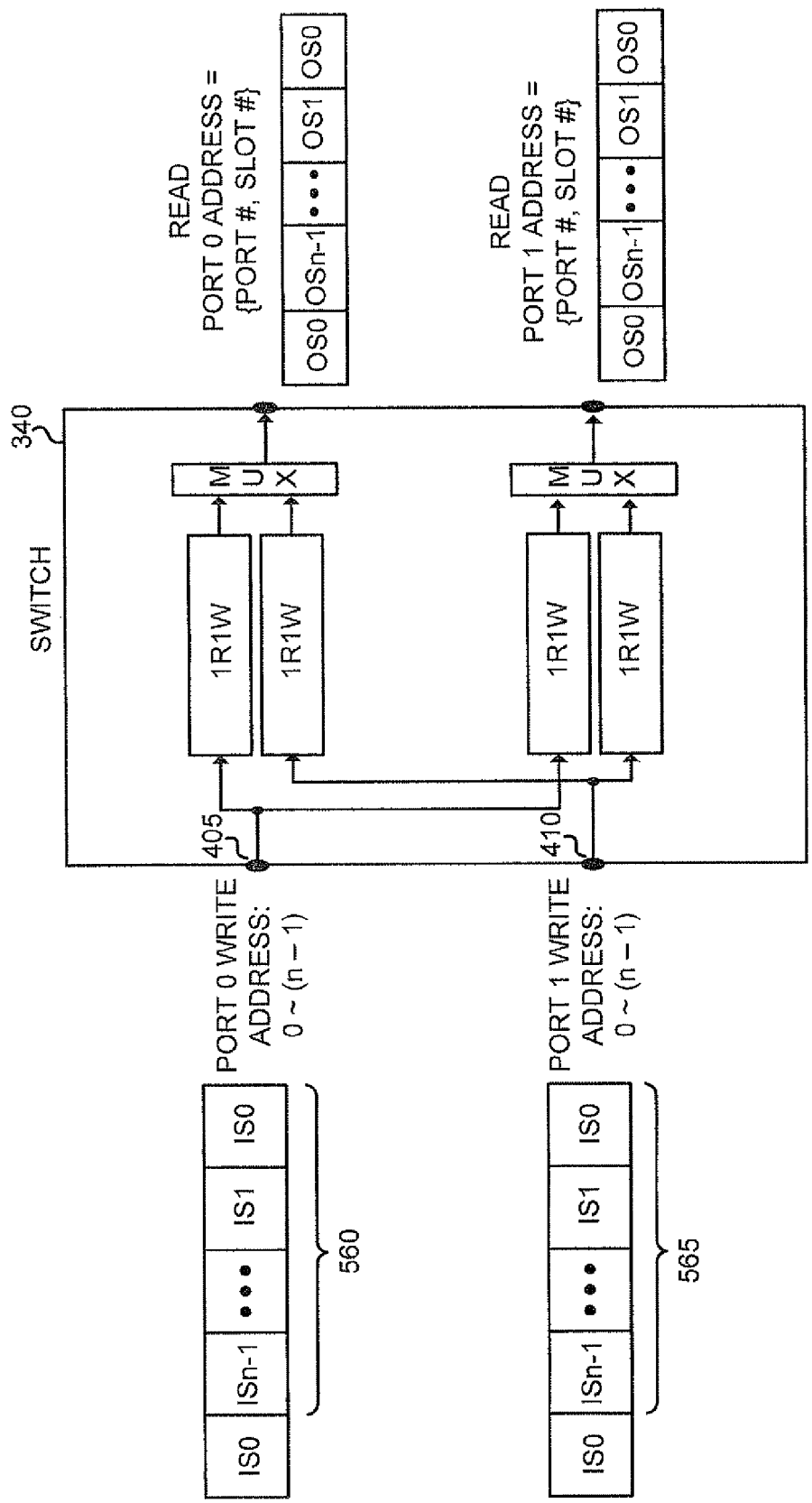
FIG. 5 is a diagram illustrating exemplary operation of the switch of FIG. 3 when being used as a switch that switches frames or packets.

FIG. 5 is a diagram illustrating exemplary operation of switch 340 when being used as a switch that switches frames or packets. In the implementation shown in FIG. 5, the data units input to switch 340 may each be data in fixed sized slots in a frame or packet. Switch 340 in FIG. 5 is identical to switch 340, as shown in FIG. 4. For clarity, address lines shown in FIG. 4 are not shown in FIG. 5.

As particularly shown in FIG. 5, sequences of frames, such as frames 560 and 565, may be input to write ports 405 and 410. Each frame, such as frame 560, may include a number n of fixed sized slots IS0 through ISn−1. Each slot may include, for example, an eight bit wide data unit. Although frames 560 and 565 are labeled using the same notation of IS0 through ISn−1, frames 560 and 565 may include different data.

To operate as a frame buffer switching memory, it may be desirable for a complete frame to be read into switch 340 before the frame is read out. In other words, a frame input to switch 340 at any of the input ports may be fully stored in the 1R1W memories before the frame is read out an arbitrary one of the output ports. Data of a particular one of the slots IS0 through ISn−1 may be stored at an address in the 1R1W memory corresponding to the slot number of the slot.

When outputting data of the slots from switch 340, the output address for data of a particular one of the slots may be based on the input port number at which the data of the slot was written and the slot number. For example, the port number may be used to control the multiplexer associated with an output port and the slot number may be used to read data of the appropriate slot from the 1R1W memories associated with the slot. In this manner, a frame, such as frame 560, may be written to switch 340 on a slot-by-slot basis and data of each slot of the frame may be output at output slot numbers 0 to n−1 from switch 340 at one of the output ports 0 or 1. The output slots corresponding to the input frames are labeled as slots OS0, OS1, through OSn−1. Input slots may be output in the same order as the input, so that IS0 corresponds to OS0, IS1 corresponds to OS1, etc., or input slots may be rearranged, so that, for example IS0 may correspond to OS2.

Simultaneous Switching of Multiple Time Slots

Figure 6:
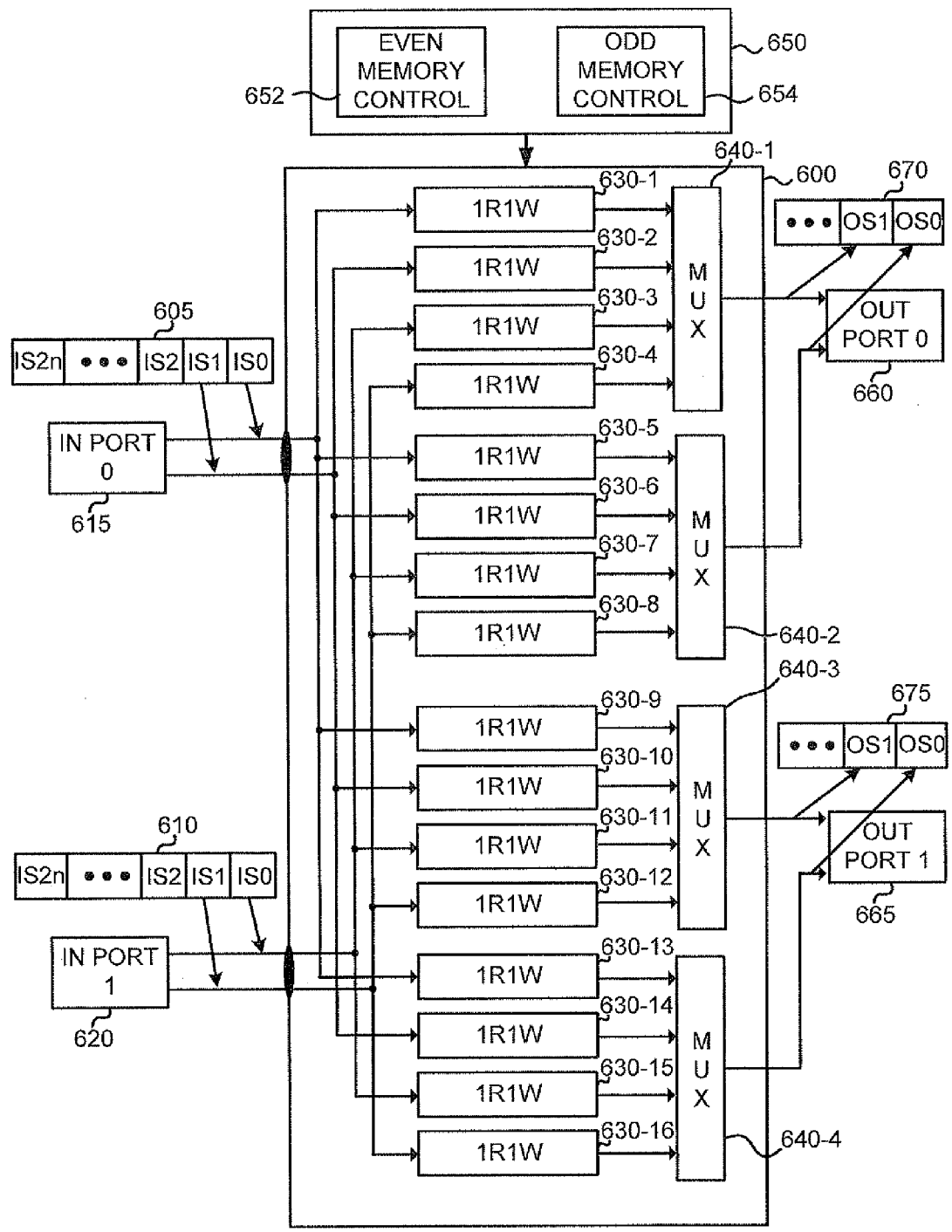
FIG. 6 is a diagram illustrating an exemplary switch for simultaneously switching two time slots per cycle.

Consistent with aspects described herein, a switch in a node 120 may be implemented in a manner that enables simultaneous reading/writing of data of multiple time slots of a frame. FIG. 6 is a diagram illustrating an exemplary switch 600 for simultaneously switching data of two time slots per cycle. Relative to the single time slot switch shown in FIG. 5, the total switching bandwidth may be doubled while using the same bandwidth memory. Additionally, for equal size frames, each 1R1W memory shown in FIG. 6 may be half the size of each 1R1W memory shown in FIG. 5.

Switch 600 may implement a four-read-four-write (4R4W) memory using 16 1R1W memories. As with the switch shown in FIG. 5, for clarity, addresses lines are not illustrated in FIG. 6. Switch 600 may include a number of 1R1W memories 630-1 through 630-16 and multiplexers 640-1 through 640-4. In this example, switch 600 includes two input ports 615 (IN PORT 0) and 620 (IN PORT 1), and two output ports 660 and 665. Memory control logic 650 may control the addressing of switch 600.

In one memory cycle, switch 600 may accept multiple simultaneous data units at each port. In the example shown in FIG. 6, assume frames 605 and 610 are being received at port 615 and 620 of switch 600, respectively. Port 615 may receive two data units, corresponding to two time slots of frame 605, for each cycle of switch 600. Port 620 may similarly receive two data units, corresponding to two time slots of frame 610, for each cycle of switch 600. In one implementation, ports 615 and 620 may each include two input lines, one of which receives data units associated with even slot numbers and the other receives data units associated with odd slot numbers.

Switch 600 may include a number of 1R1W memories 630-1 through 630-16. Memories 630 may be thought of as being logically grouped (groups 630-1 through 630-4, 630-5 through 630-8, 630-9 through 630-12, and 630-13 through 630-16) into a number of groups equal to twice the number of write ports or read ports. In the implementation shown in FIG. 6, each group includes a 1R1W memory associated with a particular input port and a particular one of the parallel data units (e.g., even slot number or odd slot number). The set of 1R1W memories associated with a single input port and odd/even slot may be referred to as a subset of memories 630. For example, 1R1W memories 630-1, 630-5, 630-9 and 630-13 may correspond to one subset of memories 630.

With the construction shown in switch 600, any read port may read the data written at any of the write port/slot number combinations. Relative to the 1R1W memories shown in FIG. 5, for equal frame sizes, each 1R1W memory 630 may be half the size of each 1R1W memory in FIG. 5.

Multiplexers 640-1 through 640-4 may each receive a data unit data from each of its four input 1R1W memories (e.g., memories 630-1 trough 630-4 for multiplexer 640-1) and output one of the received data units based on read control signals provided by memory control logic 650. As shown in FIG. 6, multiplexers 640-1 and 640-2 together provide the two parallel data units (e.g., an odd and even time slot) to output port 660. Similarly, multiplexers 640-3 and 640-4 may together provide two parallel data units to output port 665. The parallel data units provided to each of output ports 660 and 665 may be data units corresponding to consecutive time slots from an input frame. Two reassembled output frames 670 and 675 are particularly illustrated in FIG. 6. In frames 660 and 665, frames OS0 and OS1 may correspond to like numbered time slots in input frames 615 and 620, respectively. Other switching patterns may alternatively be used.

Memory control logic 650 may control the addressing of 1R1W memories 630 and control the operation of multiplexers 640 to implement switch 600. Memory control logic 650 may generate the write addresses for 1R1W memories 630 based on the slot number and frame number of each incoming data unit. Similarly, memory control logic 650 may generate the write addresses for 1R1W memories 630 based on the slot number and incoming port number of the data unit.

In one implementation, memory control logic 650 may include even memory control logic 652 and odd memory control logic 654. Even memory control logic 652 may control addressing for even slot number data units and odd memory control logic 654 may control addressing for odd slot number data units. More particularly, even memory control logic 652 may store, for each possible port and even output slot combination, the corresponding address (i.e., the input port and input slot number) that is needed to read out the data unit. Similarly, odd memory control logic 654 may store, for each possible port and odd output slot combination, the corresponding address (i.e., the input port and input slot number) that is needed to read out the data unit.

Figure 7:
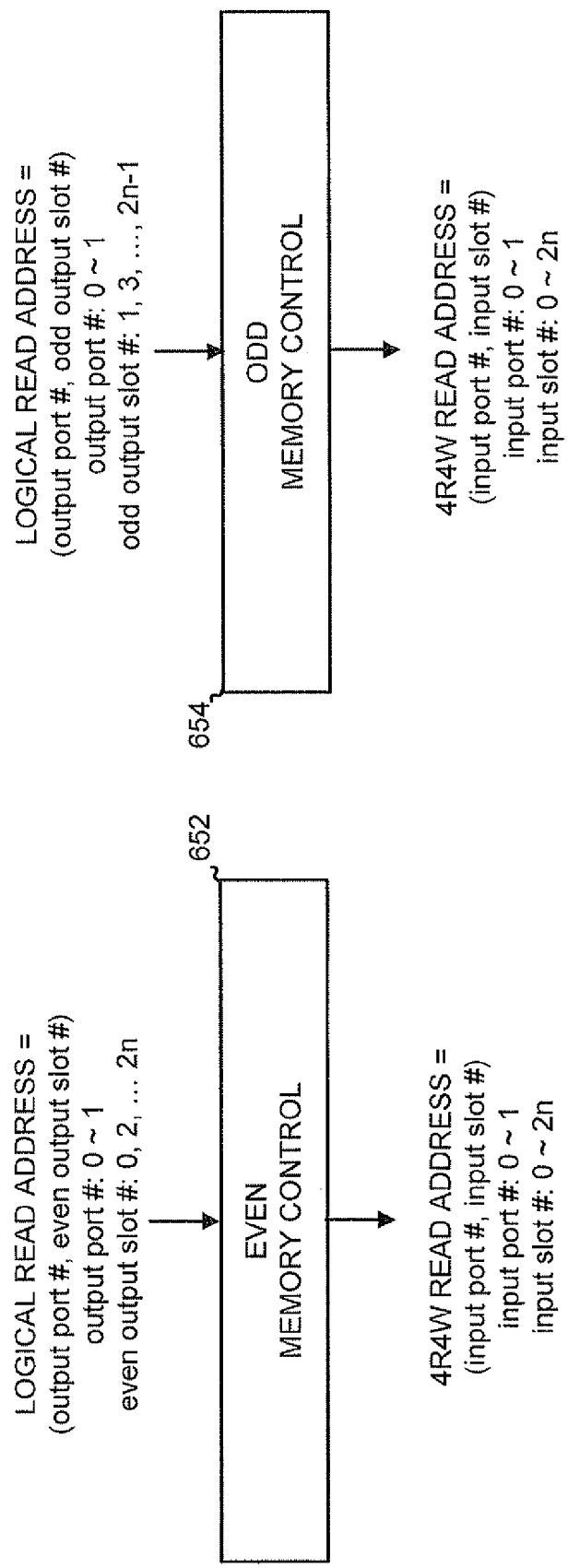
FIG. 7 is a diagram illustrating exemplary operation of even memory control logic and odd memory control logic.

FIG. 7 is a diagram illustrating exemplary operation of even memory control logic 652 and odd memory control logic 654. For the description in FIG. 7, assume that each input frame has up to 2n+1 time slots. Even memory control logic 652 may implement a lookup table that receives the output port number and even output slot number of the data unit that is to be read. Because there are two output ports and 2n+1 time slots, even memory control logic 652 may receive an input port in the range 0-1 and an output port number that is 0, 2, . . . 2n. Based on these inputs, even memory control logic 652 may lookup the corresponding input port number and input slot number of the data unit in the lookup table. The input slot number and port number, from the lookup table, may be used to directly address 1R1W memories 630 and multiplexers 640 to read the data unit.

Odd memory control logic 654 may similarly implement a lookup table that receives the output port number and odd output slot number of the data unit that is to be read. Odd memory control logic 654 may receive an input port in the range 0-1 and an output port number that is 1, 3, . . . 2n−1. Based on these inputs, odd memory control logic 654 may lookup the corresponding input port number and input slot number of the data unit in the lookup table. The input slot number and port number, from the lookup table, may be used to directly address 1R1W memories 630 and multiplexers 640 to read the data unit.

Switch 600, as described above, implements a multi-port frame buffer switch capable of rearranging the order of incoming frame time slots, as well as logically mapping frames or data of time slots to different output ports. Data of multiple time slots may be written to and read from the switch each cycle, thus potentially increasing the bandwidth of the switch. Switch 600 may be implemented using a number of 1R1W memories. Because each 1R1W memory may store data of only odd or even input time slots, the size of each 1R1W memory may be half the size of 1R1W memories in a corresponding single time slot switch such as switch 340, as shown in FIG. 5.

Figure 8:
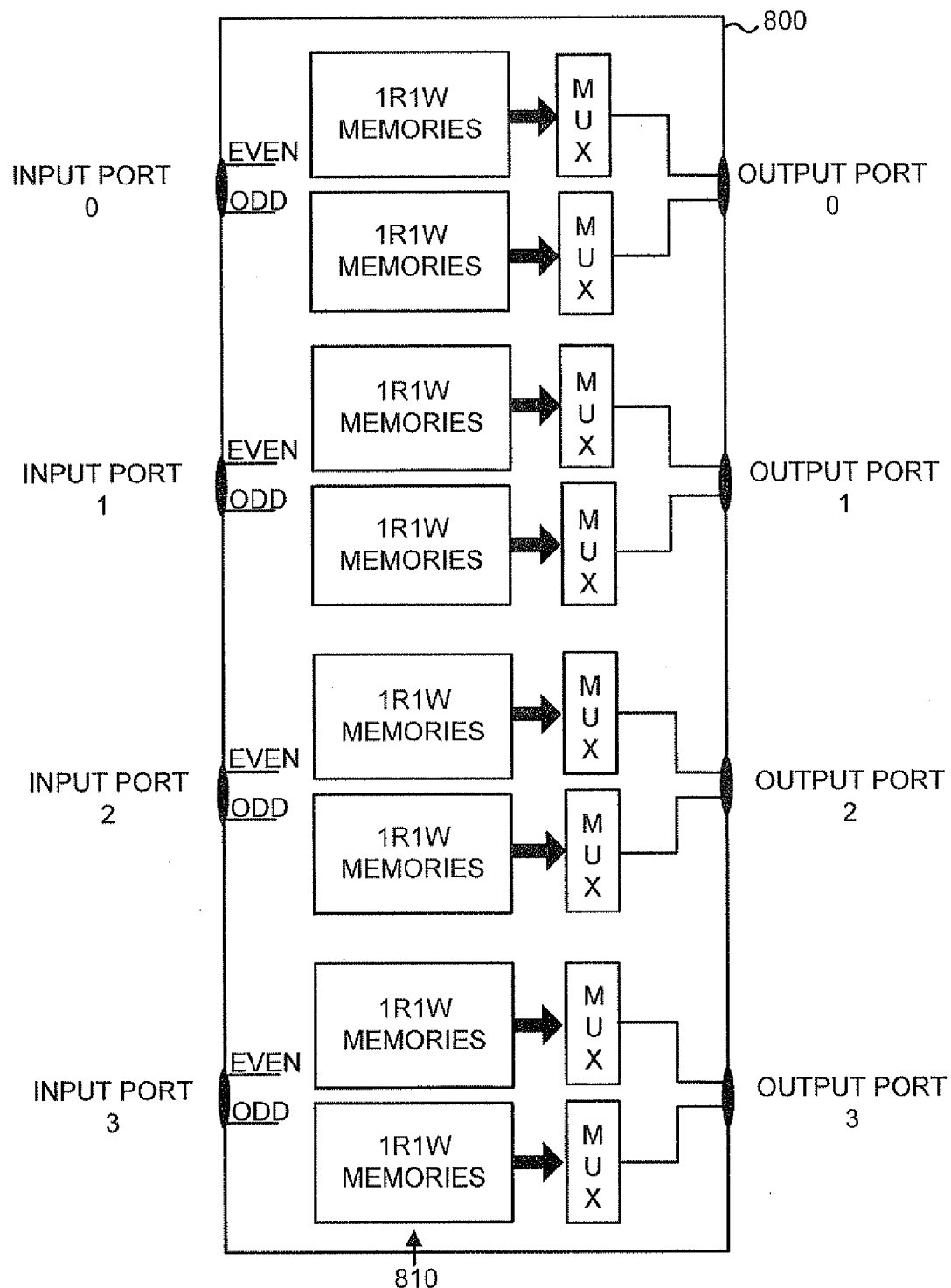
FIG. 8 is a diagram illustrating an exemplary switch that includes four input ports and four output ports.

Although switch 600 was disclosed as a two port switch for simultaneously switching data of two time slots from an input frame, in alternative implementations, switch 600 may include more or fewer input/output ports and/or may simultaneously receive data of more than two time slots from each frame. FIG. 8 is a diagram illustrating an exemplary switch 800 that includes four input ports and four output ports.

As shown in FIG. 8, four input ports receive data of even and odd frame time slots. Each input port may write data to all of the 1R1W memory groups 810. Four output ports output data corresponding to even and odd time slots. Each output port may correspond to two 1R1W memory groups 810. In the implementation shown in FIG. 8, each 1R1W memory group may include eight 1R1W memories.

Cascade of Switch with Cross-Connect

Switching of input data streams through node 120, as illustrated in FIG. 3, may be performed using multi-port memory based switches, such as switches 300, 600, and 800 to implement a switch fabric in which both the order of the input data units may be changed and logical-to-physical port mapping may be performed. An example of one application of the switching of input data streams is particularly shown in FIGS. 9 and 10.

Figure 9:
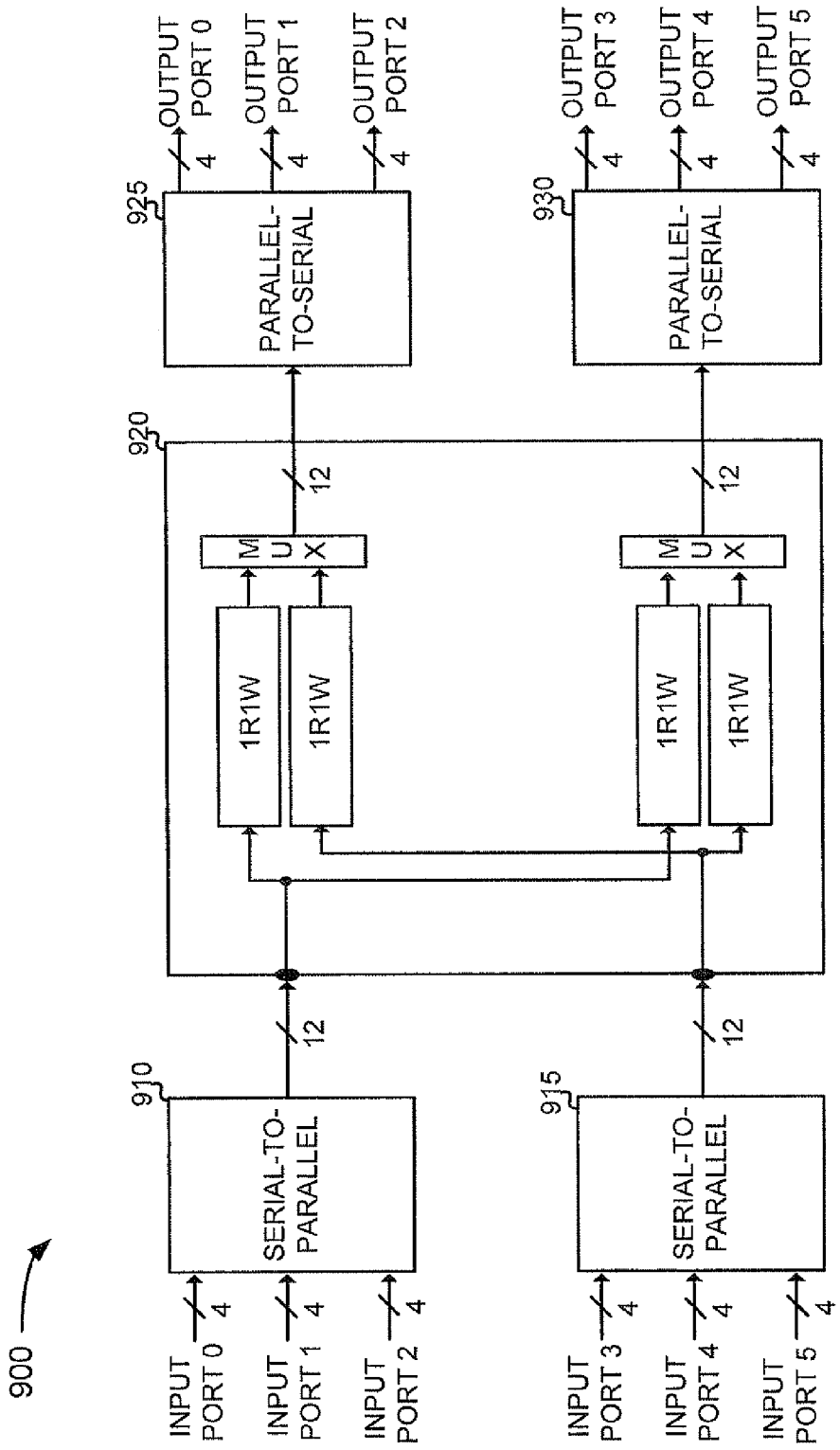
FIG. 9 is a diagram illustrating an exemplary implementation of a system for switching of input streams.

FIG. 9 is a diagram illustrating an exemplary implementation of a system 900 for switching of input streams. In FIG. 9, six input ports, labeled as input ports zero through five, receive incoming serial data signals. The data signals may be received, for example, as a stream of frames, each of which includes six time slots. After processing by system 900, the input data units may be output at six output ports, labeled as output ports zero through five, for transmission over optical links.

System 900 may include serial-to-parallel circuits 910 and 915, multi-port memory-based switch 920, and parallel-to-serial circuits 925 and 930. Serial-to-parallel circuit 910 may receive the data signals from input ports 0, 1, and 2. Serial-to-parallel circuit 915 may receive the data signals from input ports 3, 4, and 5. In the implementation shown in FIG. 9, each data unit received at an input port may be a four-bit data unit that is ⅓ of a time slot. In this situation, the output of serial-to-parallel circuits 910 and 915 may be, at each cycle, a parallel version of data of one time slot at an input port.

Multi-port memory-based switch 920 may implement a 2R2W multi-port switching memory using four 1R1W memories and two multiplexers. The operation of such a switch was previously described with respect to the switch discussed with respect to FIG. 5.

Parallel-to-serial circuits 925 and 930 may each receive the 12-bit parallel data output from switch 920 and convert the data back to serial data for output at output ports 0 through 5.

The operation of serial-to-parallel circuits 910, 915 and the operation of parallel-to-serial circuits 925 and 930 will be discussed in more detail below with reference to FIGS. 13-18.

Figure 10:
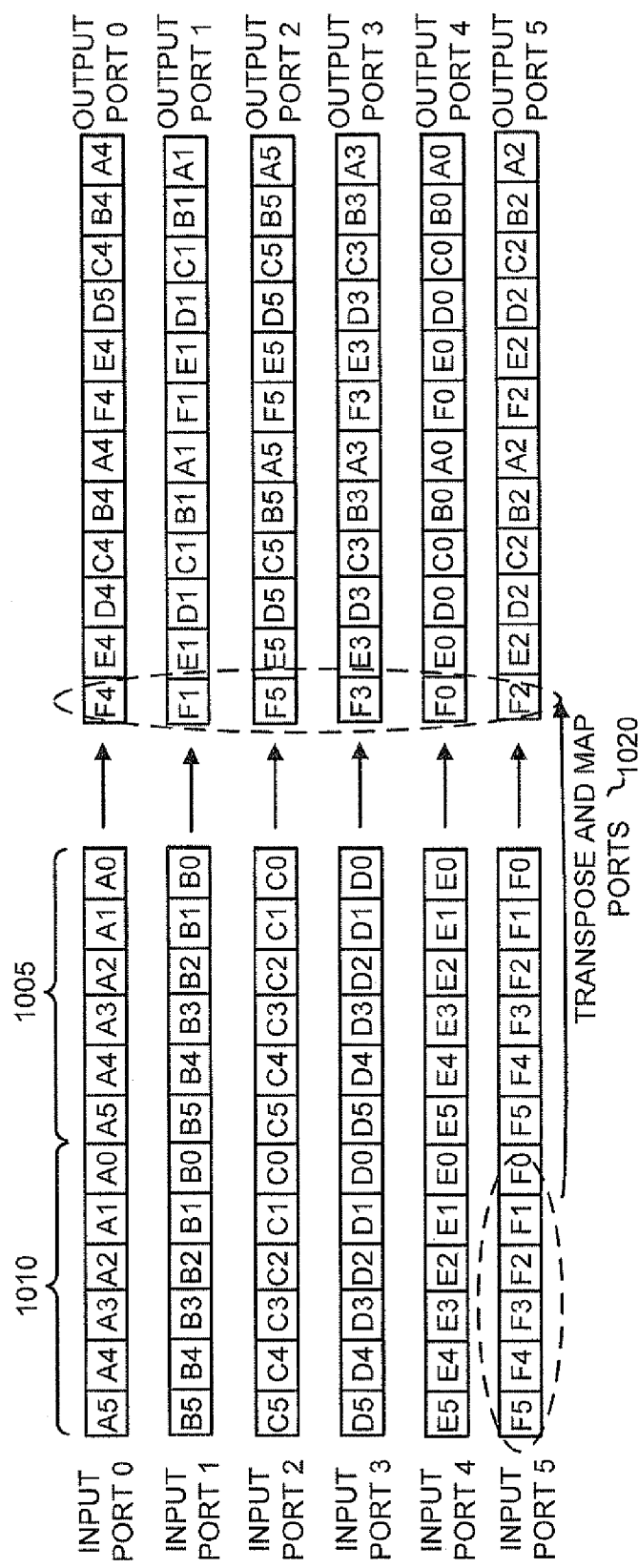
FIG. 10 is a timing diagram illustrating exemplary switching of time slots input to the system shown in FIG. 9.

FIG. 10 is a timing diagram illustrating exemplary switching of data of time slots received by system 900. At input port 0, two frames 1005 and 1010 are received. Frames 1005 and 1010 are each labeled "A" and each may include six time slots A0, A1, A2, A3, A4, and A5, each of which may be a twelve-bit wide time slot Similarly, input port 1 receives frames labeled "B", input port 2 receives frames labeled "C", input port 3 receives frames labeled "D", input port 4 receives frames labeled "E", and input port 5 receives frames labeled "F".

Through the operation of system 900, the relative order of time slots in an incoming frame may be changed and time slots may be mapped to different physical output ports. As particularly shown, frames may be transposed and mapped between ports, such as the illustrated transpose and logical to physical port mapping operation 1020. Transpose operations for different frames, such as frames A-C and D-F, may be independent. Transposing a frame so that it is output in parallel over a number of output ports may be desirable when, for example, transmitting error-correction code (ECC) information over an optical channel.

Figure 11:
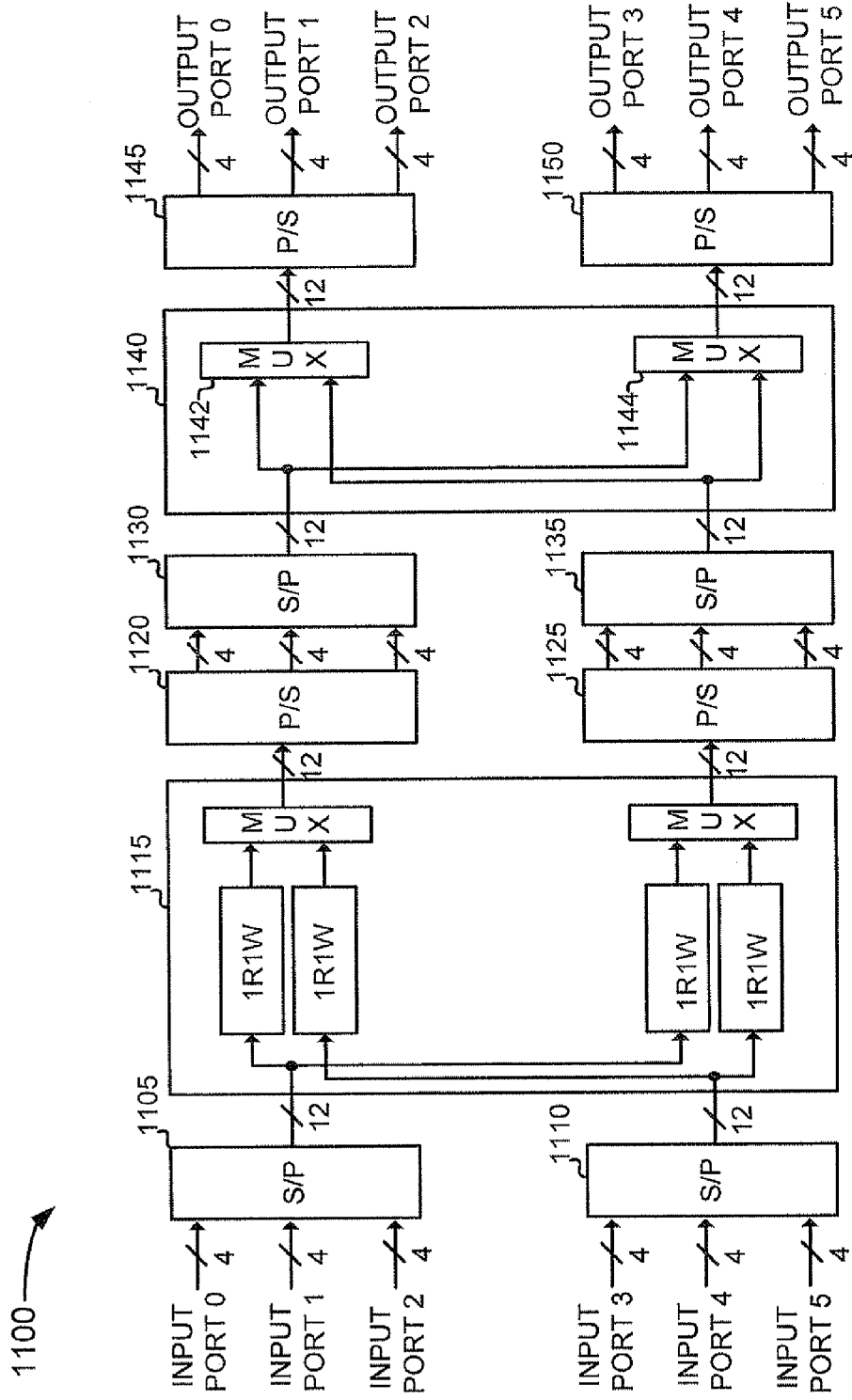
FIG. 11 is a diagram illustrating another exemplary implementation of a system for switching of serial input streams.

FIG. 11 is a diagram illustrating another exemplary implementation of a system 1100 for switching of serial input streams. System 1100 may generally include a cascade arrangement of a multi-port memory based switch 1115 and a cross-connect switch 1140. System 1100 may switch data of incoming time slots to obtain the identical output frame ordering as shown in FIG. 10 for system 900. Relative to switch 920 in system 900, however, switch 1115 may be able to use 1R1W memories that are one half the size of the 1R1W memories used in switch 920. Advantageously, by cascading switch 1115 and cross-connect switch 1140, switch 1115 of system 1100 may need half the memory used by system 900.

As with system 900, system 1100 may receive data signals, as a stream of frames, each of which may include six time slots. After processing by system 1100, the input data units may be output at six output ports, labeled as output ports 0 through 5, for transmission over optical links.

System 1100 may include serial-to-parallel circuits 1105 and 1110, multi-port memory-based switch 1115, parallel-to-serial circuits 1120 and 1125, serial-to-parallel circuits 1130 and 1135, cross-connect switch 1140, and parallel-to-serial circuits 1145 and 1150. Serial-to-parallel circuits 1105 and 1110 may receive the data signals from input ports 0 through 5. Each data signal may be received as a stream of frames, in which each frame may include four-bit wide data units in six time slots. In this situation, the output of serial-to-parallel circuits 1105 and 1110 may be, at each cycle, a parallel version of data of a time slot received at an input port.

Parallel-to-serial circuit 1120 (or 1125), followed by serial-to-parallel circuit 1130 (or 1135) may be particularly useful when intermediate processing is performed in-between parallel-to-serial circuit 1120 and serial-to-parallel circuit 1130. In situations in which intermediate processing is not needed, parallel-to-serial circuits 1120/1125 and serial-to-parallel circuits 1130/1135 may be omitted.

Multi-port memory-based switch 1115 may implement a 2R2W multi-port switching memory using four 1R1W memories and two multiplexers. The general operation of such a switch was previously described with respect to the switch discussed with respect to FIG. 5. Multi-port memory-based switch 1115 may perform a transpose operation on incoming time slots. In contrast to multi-port memory-based switch 915, which performed both a transpose operation and a logical to physical mapping of time slots, multi-port memory-based switch 1115 may not perform the logical to physical mapping as this operation may be performed by cross-connect switch 1140. Because multi-port memory-based switch 1115 may only need to perform the transpose operation, the size of the 1R1W memories may be reduced relative to 1R1W memories of multi-port memory-based switch 915.

Time slots transposed by multi-port memory-based switch 1115 may be passed through a series combination of a parallel-to-serial circuit and a serial-to-parallel circuit. As shown in FIG. 11, one output of multi-port memory-based switch 1115 may be received by parallel-to-serial circuit 1120 and serial-to-parallel circuit 1130. The other output of multi-port memory-based switch 1115 may be received by parallel-to-serial circuit 1125 and serial-to-parallel circuit 1135. Alternatively, as previously mentioned, parallel-to-serial circuit 1120/1125 and serial-to-parallel circuit 1135 may be omitted.

The parallel outputs of serial-to-parallel circuits 1130 and 1135 may be switched by cross-connect switch 1140, which may be implemented as a stateless switch using, for example, multiplexers 1142 and 1144. Multiplexers 1142 and 1144 may route each of the two inputs to cross-connect switch 1140 to either of the two outputs of cross-connect switch 1140. In this manner, parallel groupings of data units input to cross-connect switch 1140 may be switched to an output path that includes output ports 0-2 or output ports 3-5.

Parallel-to-serial circuits 1145 and 1150 may convert the outputs of cross-connect switch 1140 to serial data streams that may be output at output ports 0 through 5.

Figure 12:
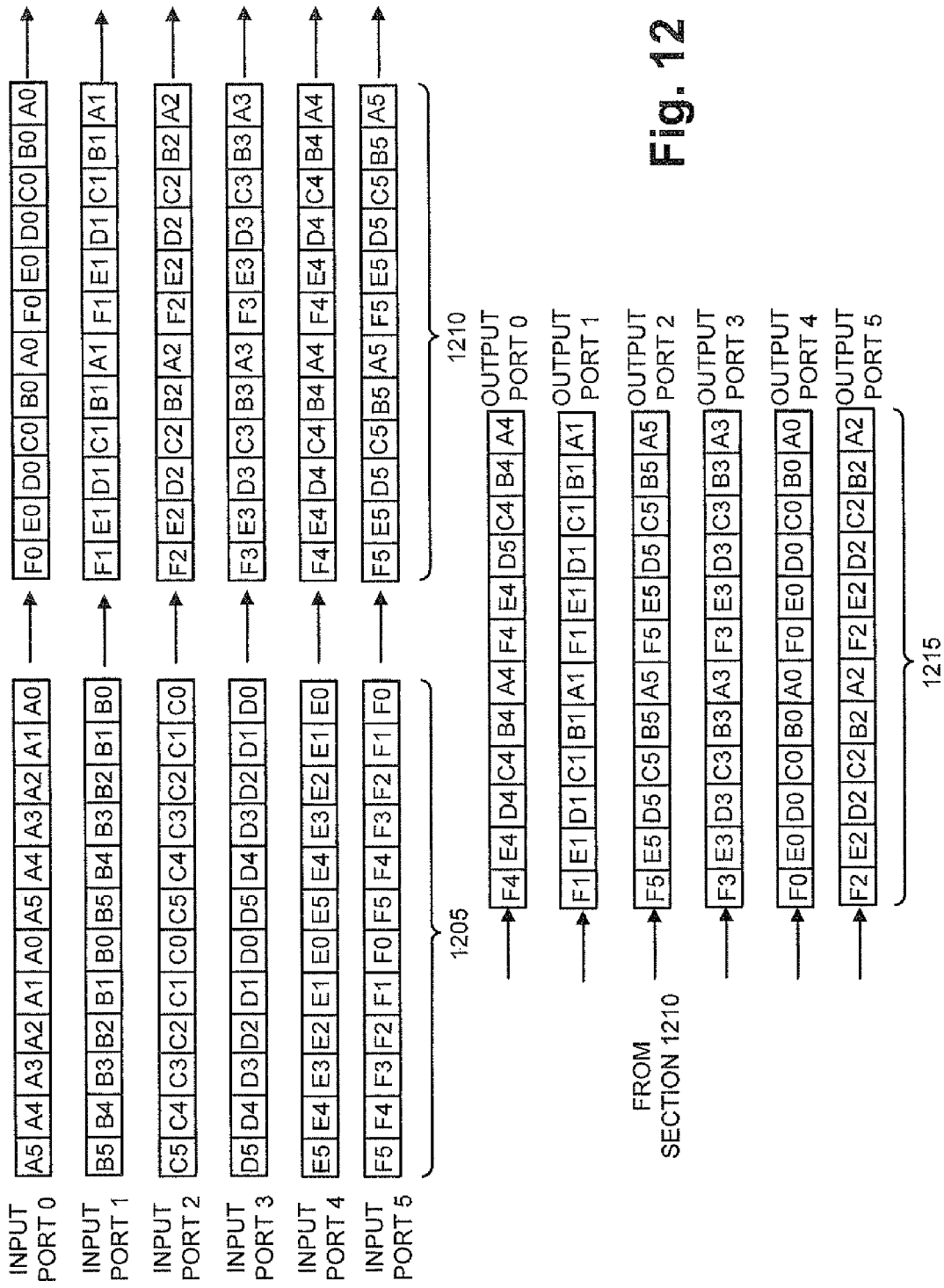
FIG. 12 is a timing diagram illustrating exemplary switching of time slots input to the system shown in FIG. 11.

FIG. 12 is a timing diagram illustrating exemplary switching of data of time slots received by system 1100. The timing diagram of FIG. 12 is divided into an input section 1205, a middle section 1210, and an output section 1215. Input section 1205 may correspond to the input data streams. Middle section 1210 may correspond to the data streams after a transpose operation, implemented by multi-port memory-based switch 1115, and output section 1215 may correspond to the output data streams, after a logical to physical mapping implemented by cross-connect switch 1140. Input section 1205 is identical to the first section in FIG. 10 and output section 1215 is identical to the output section in FIG. 10.

By cascading the time slot transpose operation and the logical to physical mapping operation using multi-port memory-based switch 1115 and cross-connect switch 1140, multi-port memory-based switch 1115 may not need to store data for all of the time slots of a frame. Instead, the top two 1R1W memories in multi-port memory-based switch 1115 may only need to store data of time slots 0 through 2 while the bottom two 1R1W memories in multi-port memory-based switch 1115 may only need to store data of time slots 3 through 5. Advantageously, each 1R1W memory in multi-port memory-based switch 1115 may be half the size of the 1R1W memories in multi-port memory-based switch 915.

Figure 13:
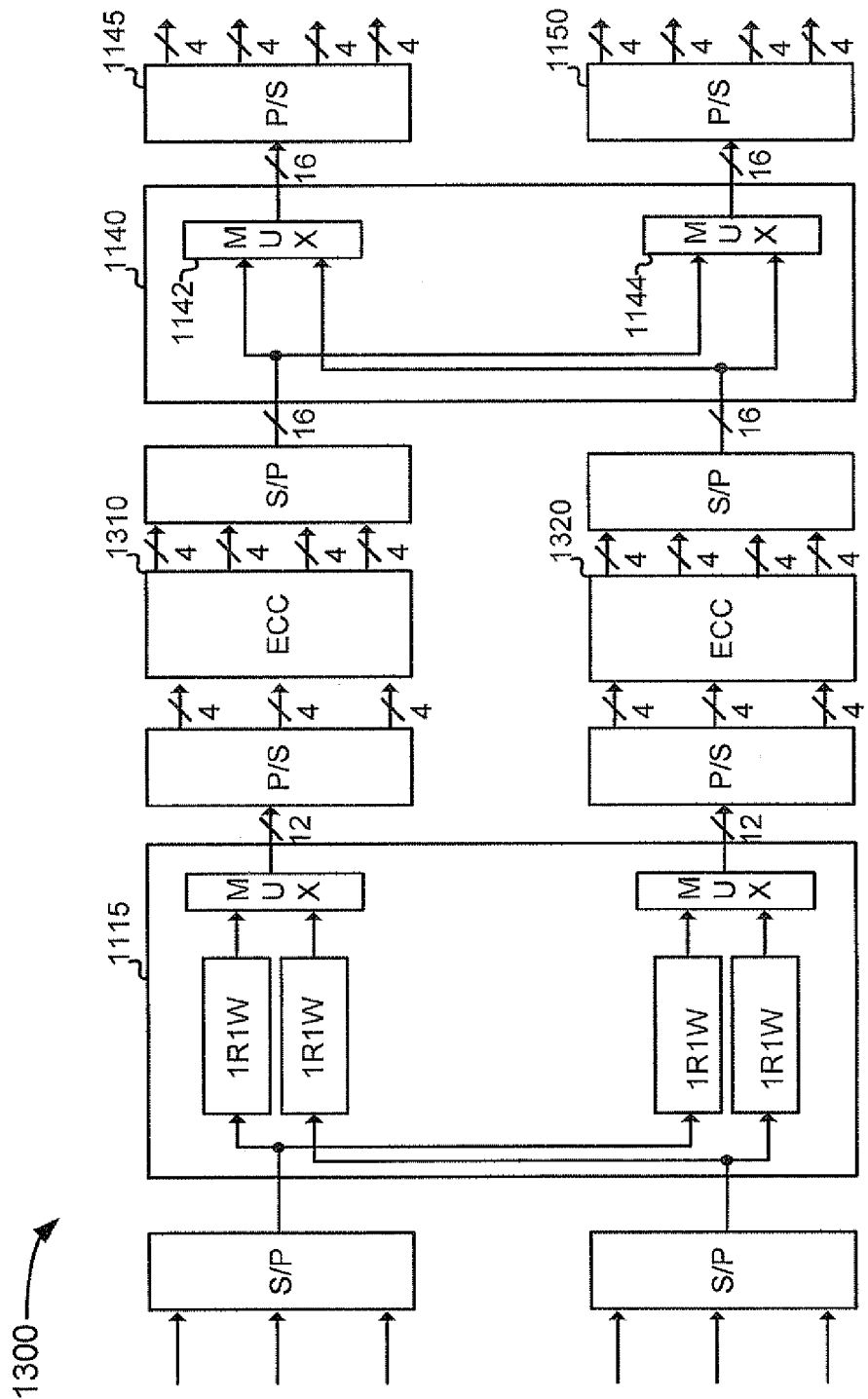
FIG. 13 is a diagram illustrating another exemplary implementation of a system for switching of serial input streams.

FIG. 13 is a diagram illustrating another exemplary implementation of a system 1300 for switching of serial input streams. System 1300 is similar to system 1100, except that intermediate processing sections are illustrated between the parallel-to-serial and serial-to-parallel circuits between switches 1115 and 1140. In this example, the intermediate processing sections are particularly illustrated as error correction code (ECC) circuits 1310 and 1320. ECC circuits 1310 and 1320 may generate error correction information for each input 12-bit data unit and output an ECC encoded version of the input information. In the example illustrated, ECC circuits 1310 and 1320 may receive the 12-bit inputs and output corresponding 16-bit ECC "codewords". The additional four-bits may be due to the additional ECC information. The codewords may then be converted back to a parallel representation, switched by switch 1140, converted to a serial representation, and output on the output ports. In this implementation, ECC information may be added to frames being switched by multi-port memory based switch 1115 and cross-connect switch 1140 without requiring additional switching or memory overhead.

Serial-to-Parallel Circuit

The serial-to-parallel circuits shown in FIGS. 9, 11, and 13 may be implemented using a number of possible paralleliza-tion techniques. Example of circuits that may be used to efficiently perform the serial-to-parallel conversion will now be described with reference to FIGS. 14-18.

Figure 14:
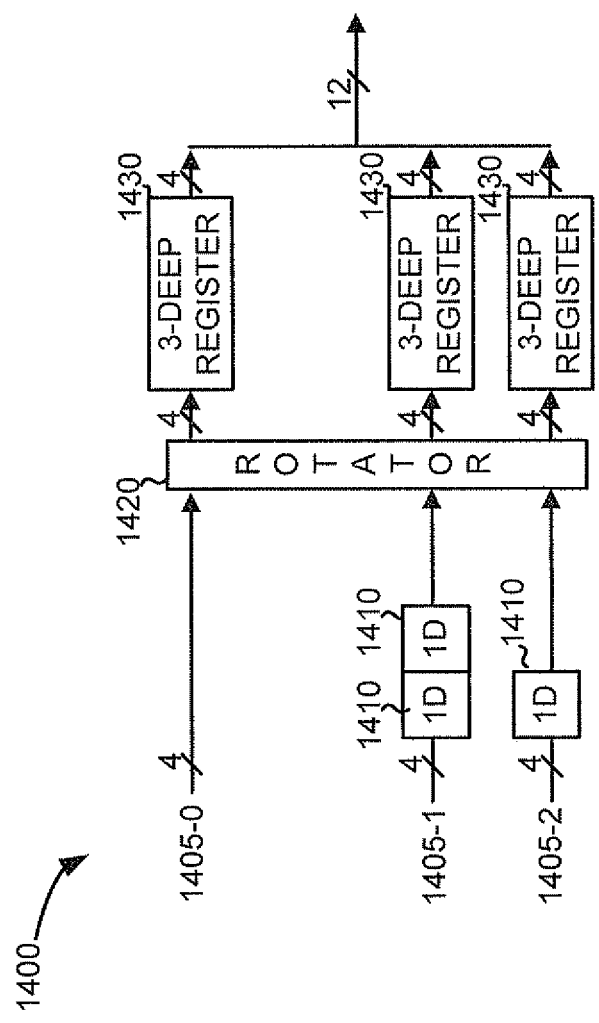
FIG. 14 is a diagram illustrating an exemplary serial-to-parallel circuit.

FIG. 14 is a diagram illustrating an exemplary serial-to-parallel circuit 1400. Serial-to-parallel circuit 1400 may be used to implement the serial-to-parallel circuits shown in FIGS. 9, 11, and 13. It can be appreciated that the width of each input data stream or the number of input data streams may be changed in different implementations. In the previous exemplary implementation of the serial-to-parallel circuits, for instance, the serial-to-parallel circuits were described as operating on three four-bit wide data streams or four four-bit wide data streams.

Serial-to-parallel circuit 1400 may include a number of delay elements 1410, a rotator 1420, and 3-deep registers 1430. Serial-to-parallel circuit 1400 may operate on input data streams 1405-0 through 1405-2.

Data streams 1405-0 through 1405-2 may be initially delayed by delay elements 1410. Each of delay elements 1410 may be implemented as, for example, a capacitive delay element, a digital latch, or another delay element. Each delay element may delay its input one clock cycle. As shown in FIG. 14, data stream 1405-0 is not delayed, data stream 1405-1 may pass through two delay elements 1310 (i.e., for a delay of two clock cycles), and data stream 1405-2 may pass through one delay element 1010 (i.e., for a delay of one clock cycle). In this manner, incoming data bits for different data streams are offset from one another when reaching rotator 1420.

Rotator 1420 may receive, in each clock cycle, the group of data bits (e.g., twelve bits in the illustrated implementation) from signal lines 1405-0 through 1405-2. Rotator 1420 may generally operate to "rotate" its input based on a rotate count value. In rotating its input, rotator 1420 may switch signals on the three input lines to various ones of the three output lines. Which input lines get switched to which output lines may depend on the rotate count value.

Figure 15:
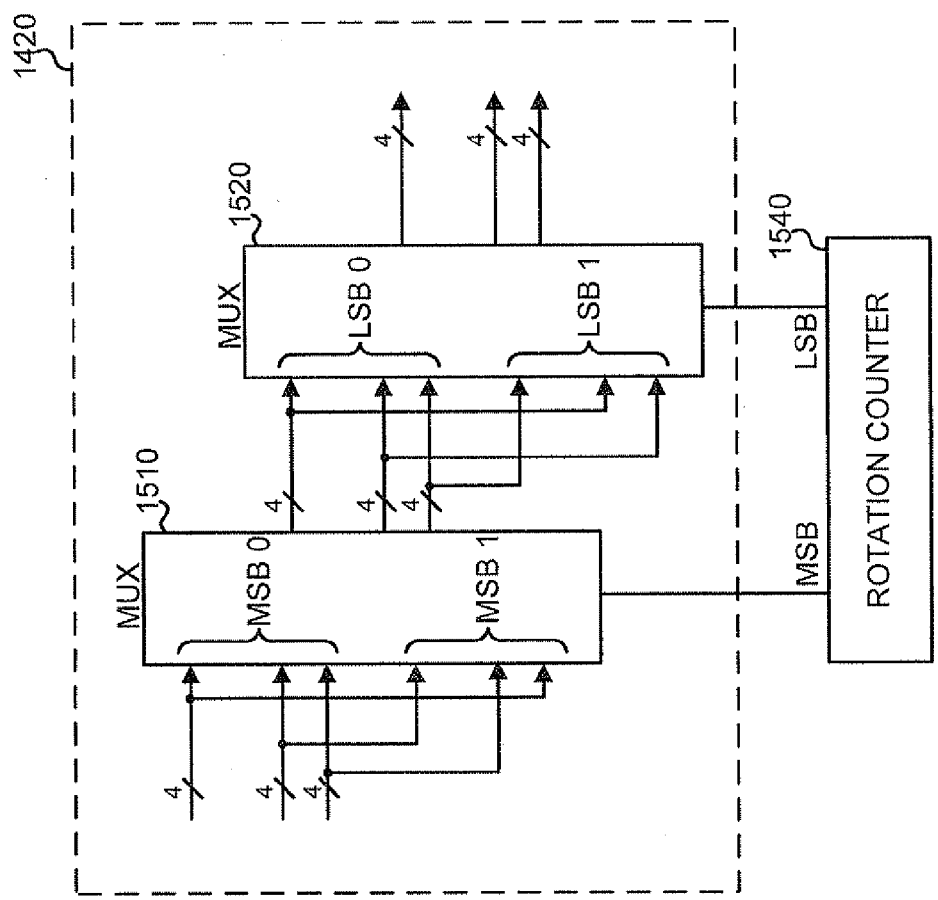
FIG. 15 is a diagram illustrating an exemplary implementation of the rotator shown in FIG. 14.

FIG. 15 is a diagram illustrating an exemplary implementation of rotator 1420. The input signals received by rotator 1420 may be input to a first multiplexer 1510. The output of first multiplexer 1510 may be output to second multiplexer 1520. Multiplexers 1510 and 1450 may each be six input, three output (6:3) multiplexers. Multiplexers 1510 and 1520 may each receive the six inputs, replicated into two groups of three and output three signals (one of the two groups) based on an input control line. The input control line for multiplexer 1510 may be the most significant bit (MSB) of a two-bit output of rotation counter 1540 and the input control line for multiplexer 1520 may be the least significant bit (LSB) of the two-bit output of rotation counter 1540. Rotation counter 1540 may be implemented as a two-bit counter. In one implementation, multiplexers 1510 and 1520 may be implemented using six separate 2:1 multiplexers (e.g., controlled switches).

Table I, below, illustrates a rotation operation as performed by rotator 1320. In Table I, assume the input signals to rotator 1320 are labeled "a", "b", "c". The output, rotated signals, for each of the three rotation count values are shown in the table. For example, when the rotation count equals two (i.e, MSB=1 and LSB=0), the output signals would be "c", "a", "b". As can be observed in Table I, over the course of the rotation count, the signal at any particular input location is switched to be output once at each of the output locations (i.e., the input at "a" is variously output at "a", "c", and "b"; the input at "b" is variously output at "b", "a", and "c", etc.).

TABLE I

| | ROTATION COUNT | | |
|---|---|---|---|
| Inputs | 0 | 1 | 2 |
| a | a | b | c |
| b | b | c | a |
| c | c | a | b |

Returning to FIG. 14, 3-deep registers 1430 may receive the values output from rotator 1420. Each of 3-deep register 1430 may include three registers to store three parallel data units. At each clock cycle, each 3-deep register 1430 may output four bits, providing, in total, a twelve-bit data unit.

Figure 16:
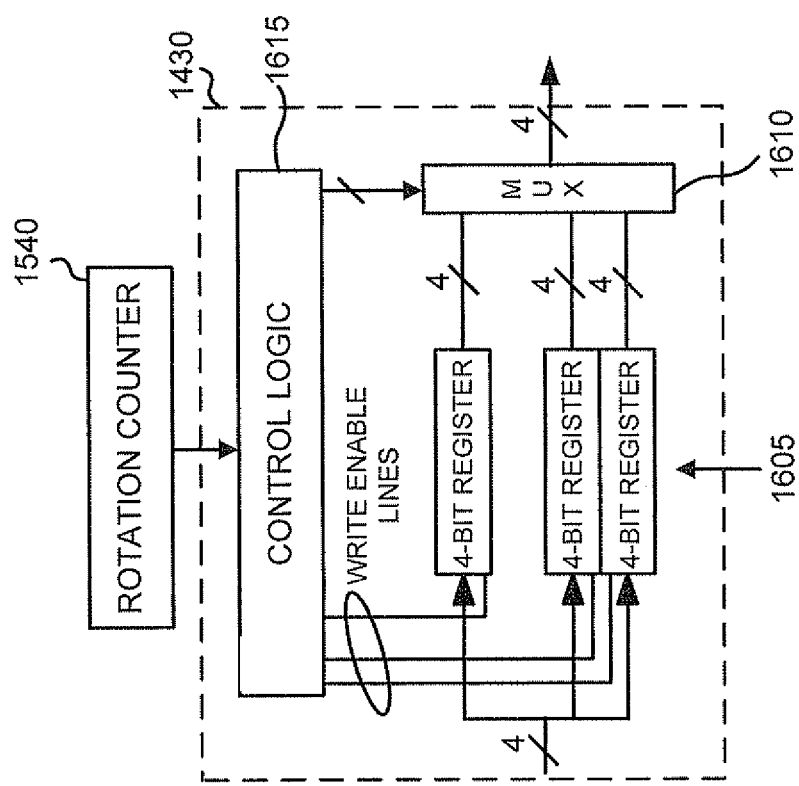
FIG. 16 is a diagram illustrating an exemplary implementation of one of the 3-deep registers shown in FIG. 14.

FIG. 16 is a diagram illustrating an exemplary implementation of one of 3-deep registers 1430. As shown, each of 3-deep registers 1430 may include three 4-bit registers 1605, each connected to one of the input signal lines and a multiplexer 1610. Multiplexer 1610 may include a multiplexer that selects one of the outputs of the 4-bit registers 1605 to output. 4-bit registers 1605 and multiplexer 1610 may be controlled by control logic 1615 based on the output of rotation counter 1540. In particular, control logic 1615 may, in each clock cycle, enable one of 4-bit registers 1605 to write its input data bit. Control logic 1615 may simultaneously control multiplexer 1610 to select the output of another of 4-bit registers 1605 to output from 3-deep register 1430.

Collectively, each of the three 3-deep registers 1430 may be controlled to output twelve parallel bits from one of signal lines 1405-0 through 1405-2.

Parallel-to-Serial Circuit

The parallel-to-serial circuits illustrated in FIGS. 9, 11, and 13 may be implemented using a number of possible serialization techniques. One example of a circuit that may be used to efficiently perform the parallel-to-serial conversion will now be described with reference to FIG. 17.

The parallel-to-serial circuits generally operate to reverse the parallelization performed by the serial-to-parallel circuits.

Figure 17:
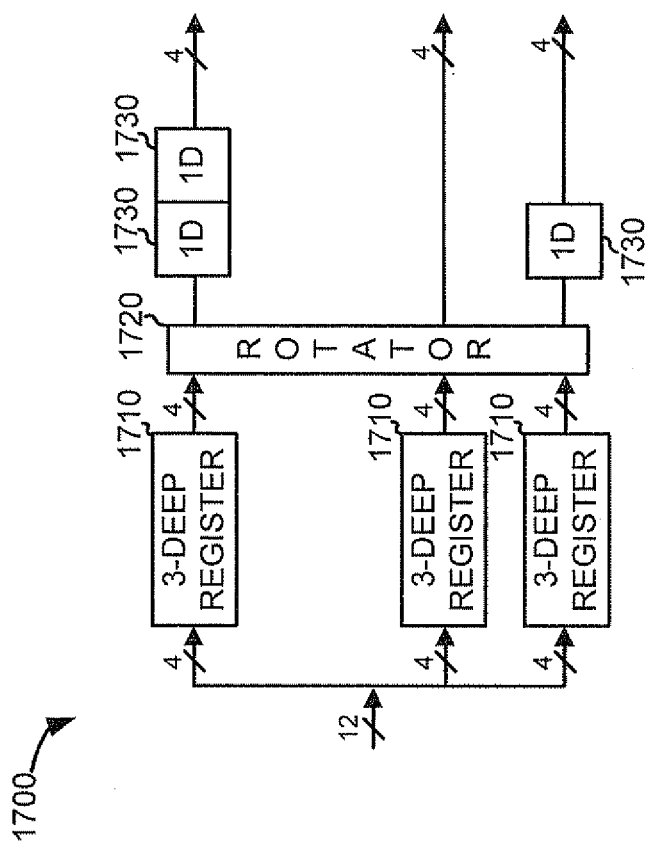
FIG. 17 is a diagram illustrating an exemplary parallel-to-serial circuit.

FIG. 17 is a diagram illustrating an exemplary parallel-to-serial circuit 1700. Parallel-to-serial circuit 1700 will be described as serializing a 12-bit wide data stream. It can be appreciated that the width of the input data stream or the number of output data streams may be changed in different implementations. Parallel-to-serial circuit 1700 may include 3-deep registers 1710, rotator 1720, and delay elements 1730.

A data unit input to parallel-to-serial circuit 1700 may be input to 3-deep registers 1710. Each of 3-deep registers 1710 may receive four of the bits from the input data unit. Each of 3-deep registers 1710 may also output four of its stored bits. The outputs may be rotated by rotator 1720, delayed by delay elements 1730, and output.

Each of delay elements 1730 may be implemented as, for example, a capacitive delay element, a digital latch, or another delay element. Each delay element 1730 may delay its input by one clock cycle.

Rotator 1720 and 3-deep registers 1710 may be constructed similarly to rotator 1320 and 3-deep registers 1330, respectively. In particular, the rotation operation may be reversed.

CONCLUSION

The foregoing description provides illustration and description, but is not intended to be exhaustive or to limit the invention to the precise form disclosed. Modifications and variations are possible in light of the above teachings or may be acquired from practice of the invention.

Also, certain portions of the implementations have been described as "components" that perform one or more functions. The term "component," may include hardware, such as a processor, an application specific integrated circuit (ASIC), or a field programmable gate array (FPGA), or a combination of hardware and software.

Further, while implementations have been described in the context of an optical network, this need not be the case. These implementations may apply to any form of circuit-switching network.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A switch, comprising:
a write port configured to receive a plurality of data units within a single switching cycle of the switch;
a plurality of memories, first selected ones of the plurality of memories constituting a plurality of memory groups and second selected ones of the plurality of memories constituting a plurality of memory subsets, each of the plurality of memory groups including a corresponding one of the plurality of memory subsets, where the write port supplies each of a plurality of copies of the plurality of data units to a corresponding one of the plurality of memory subsets;
a plurality of multiplexers, each of the plurality of multiplexers being associated with a corresponding one of the plurality of memory groups, each of the plurality of multiplexers being configured to selectively supply one of the plurality of copies of the data units from one of the plurality of groups of memories; and
a read port associated with a subset of the plurality of multiplexers, the read port configured to receive, within a single switching cycle of the switch, one of the plurality of copies of a plurality of the data units from different ones of the plurality of multiplexers,
where the received plurality of data units include a first data unit corresponding to an even numbered time slot within a sequence of time slots and a second data unit corresponding to an odd numbered time slot within the sequence of time slots, the switch further including:
even memory control logic configured to lookup first information identifying the write port and a time slot number corresponding to the write port based on a desired even time slot number that is to be output from the switch; and
odd memory control logic configured to lookup second information identifying the write port and a time slot number corresponding to the write port based on a desired odd time slot number that is to be output from the switch.

2. The switch of claim 1, where third ones of the plurality of memories store first selected ones of the plurality of data units associated with the even numbered time slot and fourth ones of the plurality of memories store second selected ones of the plurality of data units associated with the odd numbered time slot.

3. The switch of claim 1, where the looked-up first and second information is input as address information to the plurality of memories and the plurality of multiplexers.

4. The switch of claim 1, where the plurality of data units include data in time slots from a sequence of time slots, and where the switch stores an entirety of the sequence of time slots in the plurality of memories before the time slots from the sequence of time slots are received at the read port.

5. The switch of claim 1, where each of the plurality of memories includes:
a one-read-one-write (1R1W) port memory.

6. The switch of claim 1, where the write port includes a plurality of write ports and the read port includes a plurality of read ports.

7. The switch of claim 6, where each of the plurality of write ports independently supplies the copies of the data units to the plurality of memories.

8. The switch of claim 6, where each of the plurality of read ports independently receives the one of the copies of the plurality of data units from different ones of the plurality of multiplexers.

9. A storage device, comprising:
a write port configured to receive first and second data units from a sequence of data units within a single cycle of the storage device;
a plurality of memories provided in groups of memories,
where the write port supplies each of a plurality of copies of the first and second data units to first and second subsets of the plurality of memories, said each of the subsets of the memories being provided in the plurality of groups,
a quantity of the copies of the first and second data units being greater than two;
a plurality of multiplexers,
each of the plurality of multiplexers being associated with a corresponding one of the groups of memories,
where one of the plurality of multiplexers being configured to selectively supply one of the plurality of copies of the data unit from one of the plurality of memories; and
a read port to:
receive, within a single cycle of the storage device, said first and second data units from the first and second ones of the plurality of multiplexers, and
output said first and second data units,
where the first data unit corresponds to data of an even numbered time slot within a sequence of time slots, and the second data unit corresponds to data of an odd numbered time slot within the sequence of time slots, the storage device further including:
even memory control logic configured to lookup first information identifying the write port and the time slot number corresponding to the write port based on a desired even time slot number that is to be output from the storage device; and
odd memory control logic configured to lookup second information identifying the write port and the time slot number corresponding to the write port based on a desired odd time slot number that is to be output from the storage device.

10. The storage device of claim 9, where first ones of the plurality of memories store selected ones of the plurality of data units associated with even numbered time slots and second ones of the plurality of memories store selected ones of the plurality of data units associated with odd numbered time slots.

11. The storage device of claim 9, where the first and second information is input as address information to the plurality of memories and the plurality of multiplexers.

12. The storage device of claim 9, where the first and second data units include data in time slots of a frame and where the storage device stores an entire frame in the plurality of memories before data in time slots in the frame are received at the read port.

13. The storage device of claim 9, where each of the plurality of memories includes:
a one-read-one-write (1R1W) port memory.

14. The storage device of claim 9, where each of the write port independently writes data units to the plurality of memories.

15. The storage device of claim 9, where each of the read port independently reads data units from the plurality of memories.

* * * * *